United States Patent Office 2,762,741
Patented Sept. 11, 1956

2,762,741

NEW ACYLATED HYDRAZONES AND THEIR USE IN THE CONTROL OF FUNGI

Alfred Margot and Hans Gysin, Basel, Switzerland, assignors to J. R. Geigy A.-G., Basel, Switzerland No Drawing. Application May 24, 1955,
Serial No. 510,827

Claims priority, application Switzerland May 26, 1954

3 Claims. (Cl. 167—33)

The present invention is concerned with new acylated hydrazones, the production thereof as well as their use in the control of fungi. Trichloromethane sulphenyl-sulphonyl hydrazones have not been known up to now. It has now been found that compounds of the general formula:

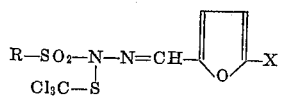

$$R-SO_2-N-N=CH-\underset{Cl_3C-S}{\overset{}{|}}-X$$

I wherein R represents a lower alkyl or monochloro-lower alkyl radical, and

X represents hydrogen, a chlorine or bromine atom or a nitro group, have an excellent fungicidal action. Because of their low toxicity to warm blooded animals and the absence of phytotoxicity when used in the concentrations which are applied in plant protection, they are suitable as active ingredients for fungicidal agents of the most different forms of application and, in particular, they are suitable for plant protection.

The new compounds can be produced in a simple manner by reacting trichloromethane sulphenyl chloride (perchloromethyl mercaptan) with a sulphonyl hydrazone of the general formula:

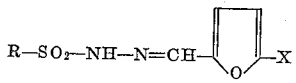

$$R-SO_2-NH-N=CH-X$$

II in the presence of an acid binding agent or with an alkali salt of such a sulphenyl hydrazone. In the above formula R and X have the meanings given above. To perform the reaction, for example, the sulphonyl hydrazone can be dissolved in diluted alkali lye and the trichloromethane sulphenyl chloride can be added dropwise or poured in at about 10–20°. Generally, the use of previously formed alkali salts dispersed in inert organic solvents as well as the reaction of the free sulphonyl hydrazones in acid binding organic solvents such as, e. g. pyridine, or in inert organic solvents in the presence of acid binding agents such as, e. g. sodium or potassium carbonate, triethylamine or tributylamine, has no advantages over the first mentioned process.

For example, N'-methane sulphonyl-, N'-ethane sulphonyl-, N'-propane sulphonyl-, N'-chloromethane sulphonyl- and N'-α-chlorethane sulphonyl- hydrazones of furfurols, 5-chloro-furfurol, 5-bromofurfurol or 5-nitrofurfurol can be used as starting materials of the general Formula II. These can be produced by reacting suitable sulphonic acid hydrazides with corresponding aldehydes.

The new trichloromethane sulphenyl-sulphonyl hydrazones are generally solid crystalline substances; sometimes they are of a honey-like consistency. The following examples further illustrate the production of the new compounds. Parts are given as parts by weight and the temperatures are in degrees centigrade. The relationship of parts by weight to parts by volume is as that of grammes to cubic centimetres.

Example 1

18.8 parts of furfurylidene-methane sulphonyl hydrazine are dissolved in 100 parts by volume of N-caustic soda lye and 19 parts of perchloromethyl mercaptan are added dropwise while stirring well at 10–15°. After stirring for some hours at room temperature, the reaction of the mixture is made weakly phenolphthalein alkaline if necessary with caustic soda lye and the pulverulent precipitate of N'-methane sulphonyl-N'-trichloromethane sulphenyl-N-furfurylidene hydrazine is drawn off under suction and washed with water.

The product can be recrystallised from methanol and melts at 127–128°.

Example 2

19 parts of perchloromethylmercaptan are added dropwise while stirring at 10–15° to a solution of 21 parts of furfurylidenechloromethane sulphonyl hydrazine in 100 parts by volume of N-causic soda lye. The whole is stirred for some hours at room temperature and then the N'-chloromethane sulphonyl-N'-trichloromethane sulphenyl-N-furfurylidene hydrazine which precipitates is filtered off under suction and washed with water. If desired, to further purify the product, it can be recrystallised from methanol.

N'-(α-chlorethane sulphonyl)- and N'-ethane sulphonyl-N'-trichloromethane sulphenyl-N-furfurylidene hydrazine can be produced in an analogous manner.

In the majority of repeated trials, the residue of a solution, equally distributed on slides of a surface area of about 19 sq. cm., of 25γ of N'-methane sulphonyl-N'-trichloromethane sulphenyl-N-furfurylidene-hydrazine in 0.25 cc. of acetone were sufficient to inhibit, in a damp atmosphere, the germination of at least 9/10 of the spores placed thereon of the following fungi: *Alternaria rosae*, *Alternaria tenuis*, *Botrytis cinerea*, *Coniothyrium diplodiella*, *Fusarium culmorum* and *Penicillium crustaceum*, whilst in individual cases, the ten-fold concentration, i. e. 250γ substance in 0.25 of acetone was necessary to attain the same effect.

The new acylated hydrazones can be used as such or in combination with suitable carriers and distributers as well as, if desired, with other substances having a fungicidal or insecticidal action for the protection of plants and parts thereof against attack by injurious fungi. They are also suitable, however, for the treatment of organic materials such as, e. g. wood, textiles, furs and leather.

For example, the active ingredients can be combined with solid pulverulent carriers such as, e. g. talc, kaolin, bole, bentonite, chalk, ground limestone, and if desired, the dusting agents obtained can be made suspendable in water by the addition of wetting and dispersing agents. Also the active ingredients can be dispersed in water with the aid of suitable emulsifiers or they can be dissolved in organic solvents, e. g. chlorinated hydrocarbons such as trichloromethylene, or in medum petroleum fractions, if necessary with the addition of auxiliary solvents such as acetone or higher ketones. The active ingredients can also be used when distributed in the air in the form of aerosols, smoke or mist, in particular, e. g. in store rooms and greenhouses.

Example 3

2–5 parts of active ingredient, e. g. N'-methane sulphonyl-N'-trichloromethane sulphenyl-N-furfurylidene hydrazine are ground with 98–95 parts of talc. The dusting agent so obtained can be used for example, for the disinfection of bedding earth, as well as for the dusting of plants or parts thereof such as bulbs and tubers.

If the content of active ingredient is increased to 15 parts and some adhesive substance is added, then very strongly fungicidal seed dressings are obtained which at the same time are non-toxic and do not influence seed germination.

*Example 4*

By grinding together 10 parts of active ingredient, e. g. N'-methane sulphonyl-N'-trichloromethane sulphenyl-N-furfurylidene-hydrazine, with 82 parts of kaolin or chalk and mixing with 8 parts of wetting and dispersing agents, e. g. 5 parts of sulphite waste liquor and 3 parts of ethylene oxide condensation products of alkyl phenols, a concentrate is obtained which on mixing with water produces a fungicidal spraying agent which is excellently suitable for the treatment of parts of plants above the ground.

*Example 5*

20 parts of active ingredient, e. g. N'-chloromethane sulphonyl - N' - trichloromethane sulphonyl - N - furfurylidene-hydrazine, 50 parts of xylene and 30 parts of ethylene oxide condensation products of alkyl phenols are mixed together to form a concentrate which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

What we claim is:

1. A new acylated hydrazone corresponding to the formula:

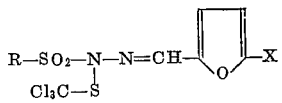

wherein R represents a member selected from the group consisting of lower alkyl and monochloro-lower alkyl radicals, and X represents a member selected from the group consisting of hydrogen, chlorine, bromine and nitro.

2. N' - methane sulphonyl-N'-trichloromethane sulphenyl-N-furfurylidene-hydrazine.

3. A fungicidal composition comprising as essential active ingredient an acylated hydrazone corresponding to the formula:

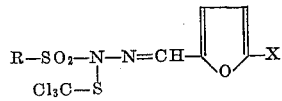

wherein R represents a member selected from the group consisting of lower alkyl and monochloro-lower alkyl radicals, and X represents a member selected from the group consisting of hydrogen, chlorine, bromine and nitro, and a carrier therefor.

References Cited in the file of this patent

UNITED STATES PATENTS

| | | |
|---|---|---|
| 2,416,239 | Stillman | Feb. 18, 1947 |
| 2,640,853 | Sundholm | June 2, 1953 |